United States Patent
Sugawara

(10) Patent No.: US 12,523,706 B2
(45) Date of Patent: Jan. 13, 2026

(54) SEMICONDUCTOR DEVICE AND METHOD OF MONITORING BATTERY REMAINING CAPACITY

(71) Applicant: RENESAS ELECTRONICS CORPORATION, Tokyo (JP)

(72) Inventor: Yusuke Sugawara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 902 days.

(21) Appl. No.: 17/720,680

(22) Filed: Apr. 14, 2022

(65) Prior Publication Data
US 2022/0349947 A1 Nov. 3, 2022

(30) Foreign Application Priority Data
Apr. 30, 2021 (JP) ................. 2021-077544

(51) Int. Cl.
*G01R 31/3842* (2019.01)
*G01R 31/36* (2020.01)
(Continued)

(52) U.S. Cl.
CPC ..... *G01R 31/3842* (2019.01); *G01R 31/3646* (2019.01); *G01R 31/374* (2019.01);
(Continued)

(58) Field of Classification Search
CPC ............ G01R 31/3842; G01R 31/3646; G01R 31/374; G01R 31/387; G01R 31/396; H01M 10/44; H02J 7/0048; Y02E 60/10
(Continued)

(56) References Cited

U.S. PATENT DOCUMENTS

| 9,263,777 B2 | 2/2016 | Kawahara et al. |
| 10,191,117 B2 | 1/2019 | Imaizumi |

(Continued)

FOREIGN PATENT DOCUMENTS

| CN | 105738815 A | 7/2016 |
| CN | 107632272 A | 1/2018 |

(Continued)

OTHER PUBLICATIONS

Extended European Search Report issued in corresponding European Patent Application No. 22169146.2-1001, dated Aug. 31, 2022.

(Continued)

*Primary Examiner* — Julian D Huffman
*Assistant Examiner* — Nathan J Instone
(74) *Attorney, Agent, or Firm* — Rimon P.C.

(57) ABSTRACT

A semiconductor device capable of reducing errors in sensing a remaining amount of a battery even when a temperature of the battery varies is provided. The semiconductor device for monitoring a battery state includes a prediction unit that predicts a temperature at a time of discharge termination of the battery according to a temperature of the battery at a predetermined time and outputs a voltage of the battery in consideration of the predicted temperature at the time of the discharge termination, and a remaining amount detecting unit that detects the remaining amount of the battery based on the voltage of the battery outputted by the prediction unit and a current of the battery at a predetermined time.

8 Claims, 10 Drawing Sheets

(51) Int. Cl.
  *G01R 31/374* (2019.01)
  *G01R 31/387* (2019.01)
  *G01R 31/396* (2019.01)
  *H01M 10/44* (2006.01)
  *H02J 7/00* (2006.01)

(52) U.S. Cl.
  CPC .......... *G01R 31/387* (2019.01); *G01R 31/396* (2019.01); *H01M 10/44* (2013.01); *H02J 7/0048* (2020.01); *Y02E 60/10* (2013.01)

(58) Field of Classification Search
  USPC ........................................................ 320/136
  See application file for complete search history.

(56) References Cited

U.S. PATENT DOCUMENTS

2014/0177145 A1* 6/2014 Kawahara ........... H01M 10/482
  361/679.01
2015/0054462 A1* 2/2015 Weidinger ............. H02H 5/047
  320/109
2015/0177333 A1* 6/2015 Montaru ............... G01R 31/385
  702/63
2019/0113578 A1* 4/2019 Um .................... G01R 31/3842

FOREIGN PATENT DOCUMENTS

| | | |
|---|---|---|
| CN | 106483470 B | 12/2018 |
| JP | 4215152 B2 | 1/2009 |
| JP | 2014-119265 A | 6/2014 |
| JP | 2015-531963 A | 11/2015 |
| KR | 2016-0113011 A | 9/2016 |
| KR | 2021-0046902 A | 4/2021 |

OTHER PUBLICATIONS

Office Action dated Jun. 18, 2024 from corresponding JP Application No. 2021-077544, 9 pages.

* cited by examiner

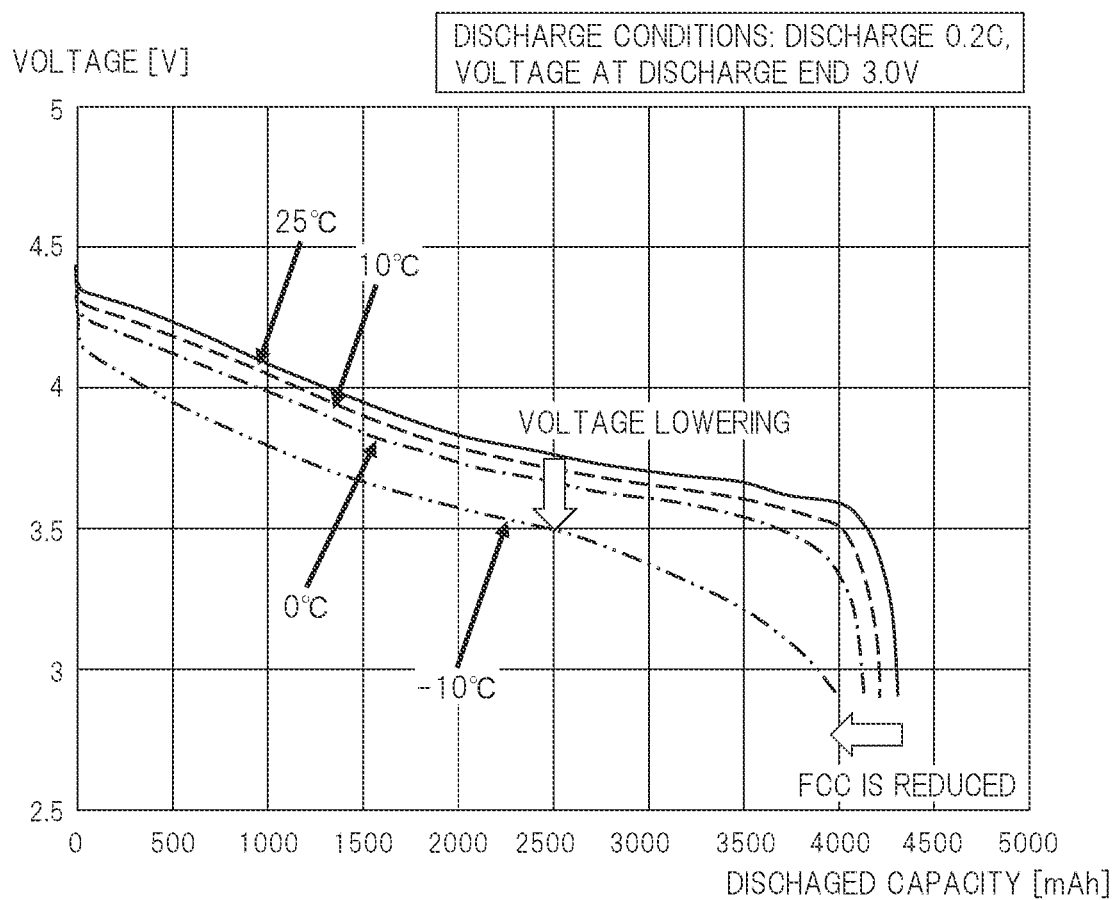
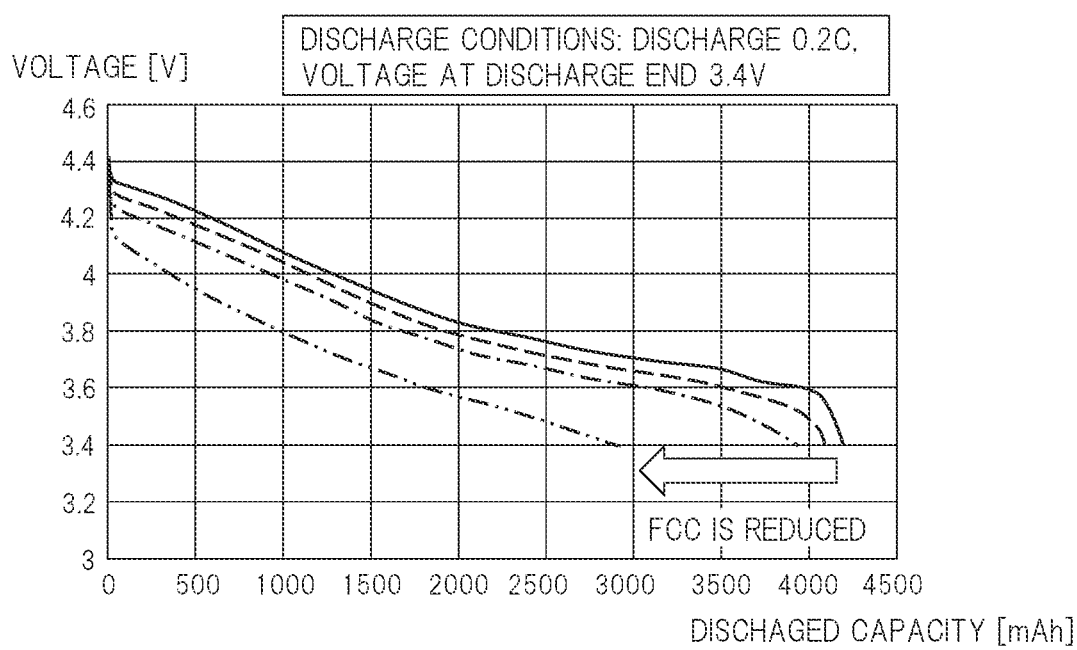

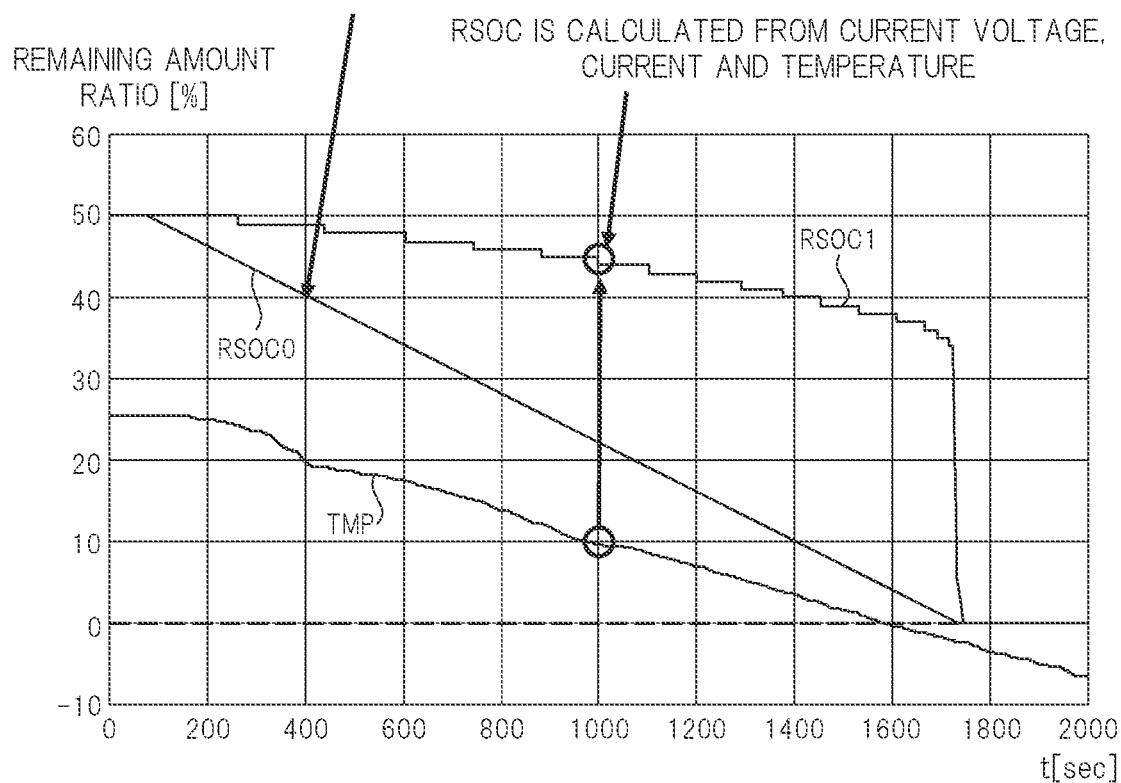

FIG. 10

$$SOC0 = SOC(OCV) \quad \cdots \text{FORMULA (1)}$$

$$\Delta SOC = 100 * \int Idt/Qmax \quad \cdots \text{FORMULA (2)}$$

$$SOC = SOC0 + \Delta SOC \quad \cdots \text{FORMULA (3)}$$

$$CCV = OCV - R*I \quad \cdots \text{FORMULA (4)}$$

$$ATTE\_CCV = (V_{EOD} - CCV)/a_v \quad \cdots \text{FORMULA (5)}$$

$$TH_{EOD} = TH_0 + a_{TH} * ATTE\_CCV \quad \cdots \text{FORMULA (6)}$$

SEMICONDUCTOR DEVICE AND METHOD OF MONITORING BATTERY REMAINING CAPACITY

CROSS-REFERENCE TO RELATED APPLICATIONS

The disclosure of Japanese Patent Application No. 2021-077544 filed on Apr. 30, 2021 including the specification, drawings and abstract is incorporated herein by reference in its entirety.

BACKGROUND

The present invention relates to a semiconductor device and a battery remaining amount monitoring method. For example, the present invention relates to a semiconductor device for monitoring the remaining amount of a battery such as a lithium-ion battery (secondary battery) and a battery remaining amount monitoring method executed in the semiconductor device.

Patent Document 1, for example, discloses a semiconductor device for monitoring a state of a battery. Patent Document 1 discloses a semiconductor device capable of generating state information including a capacity that can be taken out from the battery when the battery is discharged from the fully charged state to the discharge cutoff voltage based on measurement results of a voltage, current and temperature.

[Patent Document 1] Japanese Unexamined Patent Application Publication No. 2014-119265

SUMMARY

Batteries, such as lithium-ion batteries, generally vary in capacity that can be extracted depending on the temperature of the battery when discharged at the same current rate. FIG. 8 is a diagram showing the characteristics of the output voltage-capacity (discharge capacity)-temperature of the battery. FIG. 8 shows the properties when changing the temperature of the battery at 25° C., 10° C., 0° C. and −10° C. when discharging at a constant current rate (0.2 C) setting the discharge cutoff voltage at 3.0V (FIG. 8A) or 3.4V (FIG. 8B) as discharge conditions. Here, C represents a current to be discharged from the fully charged state to the discharge cutoff voltage in 1 hour. The discharge cutoff voltage also represents a threshold voltage for determining whether or not to extract the stored energy of the battery. In the range where the output voltage of the battery is lower than the discharge cutoff voltage, extraction of stored energy of the battery is prohibited. Incidentally, in FIG. 8, a case of the temperature at 25° C. is indicated by a solid line, the case at 10° C. is indicated by a broken line, a case at 0° C. is indicated by a dashed one-dot line, the case at −10° C. is indicated by a two-dot chain line. Further, in FIG. 8, the FCC shows a capacity that can be taken out from the battery (full charge capacity) when the battery is discharged from the fully charged state to the discharge cutoff voltage at a predetermined discharge rate.

As shown in FIGS. 8A and 8B, when the temperature of the battery decreases, the ejectable capacity (FCC) is reduced. In addition, the internal resistance of the battery increases in response to a decrease in the temperature of the battery, and in the case of the same current rate, an output voltage of the battery decreases. This is caused by the fact that the movement of lithium ions in the battery becomes difficult to move at low temperatures, which is caused by the increase of the internal resistance of the cell and the increase of the voltage drop. Furthermore, as can be seen from the comparison of FIG. 8A and FIG. 8B, when the discharge termination voltage is increased, the difference in full charge capacity due to temperature increases. Thus, it is necessary to consider the temperature when monitoring the remaining amount of the battery since the temperature of the battery changes the full charge capacity that can be removed.

In the technique Patent Document 1 discloses, the full charge capacity is obtained based on the current (in predetermined time) temperature of the battery, the voltage and current. The inventors of the present invention have studied the technique of Patent Document 1 and it was discovered that an error occurs in the full charge capacity or the like when there is a difference between the current temperature of the battery and the temperature of the battery when the voltage of the battery reaches the discharge termination voltage (at the time of discharge termination).

A brief summary of representative of the embodiments disclosed in the present application will be described below.

That is, a semiconductor device for monitoring a battery state according to the embodiment includes a prediction unit for predicting a temperature at the time of discharge termination of the battery from a temperature of the battery at a predetermined time and outputting a voltage of the battery in consideration of the predicted temperature at the time of discharge termination, and a remaining amount detecting unit for detecting the remaining amount of the battery based on the voltage of the battery output by the prediction unit and the current of the battery at the predetermined time.

Other problems and novel features will become apparent from the description herein and from the accompanying drawings.

According to an embodiment, it is possible to provide a semiconductor device capable of reducing errors in a detection of a remaining amount or the like of a battery even when a temperature of the battery is changed.

BRIEF DESCRIPTIONS OF THE DRAWINGS

FIG. 8A is a diagram showing characteristics of output voltage-capacity-temperature of the battery.

FIG. 8B is a diagram showing characteristics of output voltage-capacity-temperature of the battery.

FIG. 9 is a diagram for explaining contents studied by the inventors of the present invention.

FIG. 10 is a diagram showing a mathematical formula according to the embodiment.

DETAILED DESCRIPTION

Figure 1:
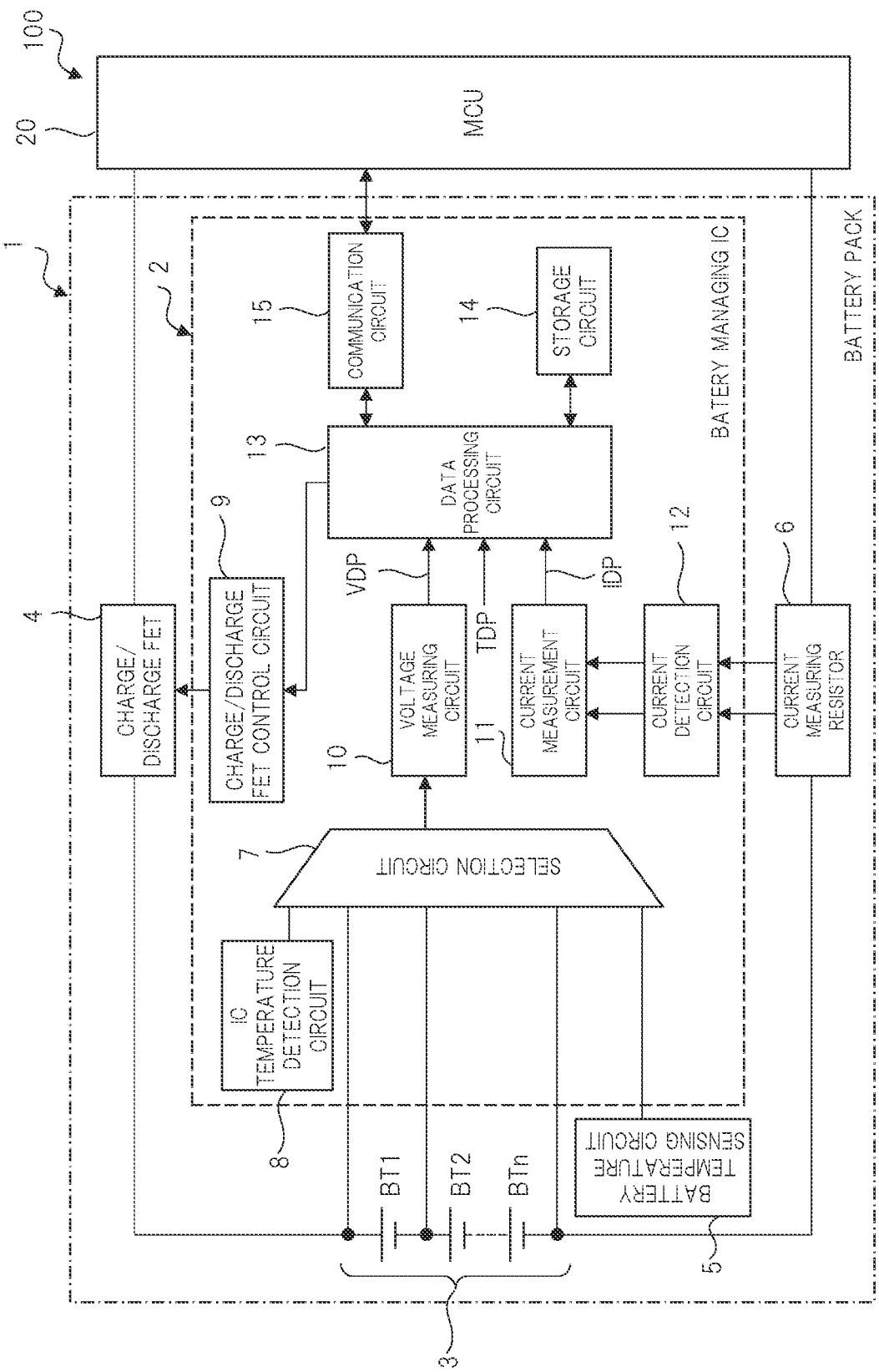
FIG. 1 is a block diagram showing a configuration of an electronic device according to the embodiment.

Hereinafter, embodiments of the present invention will be described with reference to the drawings. The disclosure is merely an example. For those skilled in the art, any features that can be easily conceived of appropriate modifications will be naturally included within the scope of the invention while maintaining the subject matter of the invention.

Further, in the present specification and the figures, the same elements as those described above with respect to the previously described figures are denoted by the same reference numerals, and a detailed description thereof may be omitted as appropriate.

Prior to the description of each embodiment, the inventors of the present inventions will be described the contents of the study and discovered. FIG. 9 is a diagram for explaining the contents studied by the inventors of the present invention. The vertical axis indicates the percentage of remaining battery power, and the horizontal axis indicates discharge time. Further, in FIG. 9, TMP indicates the temperature of the battery. Here, as a condition, a case of discharging at a constant current rate (0.2 C) and lowering the temperature from room temperature (25° C.) to −10° C. at a constant ratio (slew rate: 1° C./1 minute) is shown.

In FIG. 9, RSOC0 shows the transition of a remaining amount ratio of a true value when a capacity that can be actually taken out by the time of discharge termination and the full charge capacity. Since it is discharged at a constant current (0.2 C), the capacity that can be extracted is constant, and the decrease in capacity with the passage of time also becomes the same. Therefore, the remaining amount ratio RSOC0 of the true value becomes linear as shown in FIG. 9.

In contrast, according to the technique of Patent Document 1, in accordance with the current temperature, voltage and current, the remaining amount ratio is calculated. That is, when the temperature of the battery is changed, the calculation of the remaining amount ratio is performed so as to correspond to the temperature change at that time. Therefore, according to Patent Document 1, since the full charge capacity varies with temperature change, the remaining amount ratio becomes curved as shown by RSOC1. Consequently, the closer to the discharge-termination voltage, the greater the difference between the remaining ratio RSOC0 of the true value, and thus a large error occurs.

EMBODIMENTS

FIG. 1 is a block diagram showing a configuration of an electronic device according to the embodiment. The electronic device 100 includes a plurality of components for realizing the function of the electronic device 100, and a battery pack 1 attached to the electronic device 100. From the battery pack 1, power supply (discharge) is performed for a plurality of components, the electronic device 100 operates. In FIG. 1, a processor (MCU as a semiconductor device: Micro Control Unit) 20 which operates according to a program is depicted as an example of a component powered from the battery pack 1. Next, a configuration of the battery pack 1 will be described.

<Configuration of Battery Pack>

The battery pack 1 includes a battery pack (hereinafter, simply referred to as a battery) 3 composed of a plurality of lithium batteries BT1 to BTn, a battery temperature detecting circuit 5 mounted on the battery 3, a charge/discharge FET 4 connected between the battery 3 and the power supply terminal of the processor 20, a current measuring resistor 6 for measuring the current of the battery 3, and a battery managing IC (a semiconductor device for managing the battery) 2 for monitoring the state of the battery 3.

In FIG. 1, the battery 3 is comprised of a plurality of lithium cells BT1-BTn, but not limited thereto, and may be comprised of a single lithium cell. Also, when the plurality of lithium cells BT1 to BTn constitute the battery 3, depending on the power to be fed, the lithium cells may be connected in parallel to each other, in series with each other, or a combination thereof.

The charge/discharge FET 4 is composed of field-effect transistors controlled by a cell-management IC 2. When powering the processor 20, the battery-management IC 2 turns on the charge/discharge FET 4. Thus, the stored energy of the battery 3 is extracted (discharged) and power is supplied to the processor 20. Further, when the battery management IC 2 detects an abnormal state or the like of the battery 3, the battery management FET 4 is turned off and the power supply to the processor 20 is stopped.

Further, when charging the battery 3, the charge/discharge FET 4 is turned on, power is supplied to the battery 3 via the charge/discharge FET 4, so that the stored energy is charged in the battery 3.

The current measuring resistor 6 is connected between the battery 3 and the power supply terminal of the processor 20 to convert the current of the battery 3 supplied from the battery 3 to the processor 20 to a voltage. The voltage converted by the current measuring resistor 6 is supplied to the battery management IC 2.

The battery temperature sensing circuit 5 is attached to the surface of the battery 3, for example, a thermistor, and outputs the temperature information according to a resistance value of the thermistor determined by the temperature of the battery 3 to the battery management IC 2. Thus, the temperature of the battery 3 will be notified to the battery control IC 2 as the temperature information.

Next, the battery-management IC 2 will be described.

<<Battery Management IC>>

The battery management IC 2, not shown in FIG. 1, is powered from the battery 3 and operated by the powered power.

The battery management IC 2 includes an IC temperature detection circuit 8, a selection circuit 7, a charge/discharge FET control circuit 9, a voltage measurement circuit 10, a current measurement circuit 11, a current detection circuit 12, a data processing circuit 13, a storage circuit 14, and a communication circuit 15.

The IC temperature detection circuit 8 measures the temperature of the battery management IC 2, not the temperature of the battery 3, and supplies the measurement result to the selection circuit 7 as the temperature information of the battery management IC 2.

The selection circuit 7, although not shown, is controlled by a control signal from the data processing circuit 13, from a plurality of voltages supplied from the battery 3, selects a predetermined voltage, and supplies the voltage measuring circuit 10. Further, in accordance with a control signal from the data processing circuit 13, the selection circuit 7 supplies the temperature information of the battery 3 and the temperature information of the battery management IC 2 notified from the battery temperature detection circuit 5 to the data processing circuit 13 as the current (present) temperature information. In FIG. 1, as the current temperature information, the current temperature information relating to the battery 3 is indicated as a code TDP.

The voltage measuring circuit 10 measures the voltage of the battery 3 supplied from the selection circuit 7 as the current voltage information VDP, and supplies it to the data processing circuit 13.

The current sensing circuit 12 detects the current information of the battery 3 which is converted into a voltage by the current measuring resistor 6 described above, and supplies it to the current measuring circuit 11. The current measuring circuit 11 supplies the current information of the battery 3 to the data processing circuit 13 as the current information IDP of the current battery 3.

The data processing circuit 13, based on the voltage information VDP, the current information IDP and temperature information TDP which have been supplied, monitors the state of the battery 3, and supplies a result of the monitoring to the communication circuit 15. The communication circuit 15 notifies the result of monitoring to the processor 20. Thus, the state of the battery 3 is notified to the processor 20. The communication circuit 15 also supplies instructions and data from the processor 20 to the data processing circuit 13. Thus, the data processing circuit 13 will be controlled by the processor 20.

Further, the data processing circuit 13 supplies the result of monitoring to the charge-discharge FET control circuit 9. The charge-discharge FET control circuit 9, according to the result of monitoring, controls the charge-discharge FET 4.

Without particular limitation, the data processing circuit 13 is constituted by a processor that executes processing according to a program. In the storage circuit 14, data or the like to be used when the processor constituting the data processing circuit 13 executes processing is stored in advance. The processor then accesses the data in the storage circuit 14 upon execution of the process. As the data stored in the storage circuit 14, similarly to the storage unit (124) shown in FIG. 1 in Patent Document 1, there is data relating to the internal resistance of the battery 3.

Here, an example in which the data processing circuit 13 is constituted by a processor, but is not limited thereto. For example, the data processing circuit 13 may be configured by combining hardware such as logic circuits.

Next, the processing performed in the data processing circuit 13 will be described with reference to the drawings.
<Processing in the Data Processing Circuit>

Figure 2:
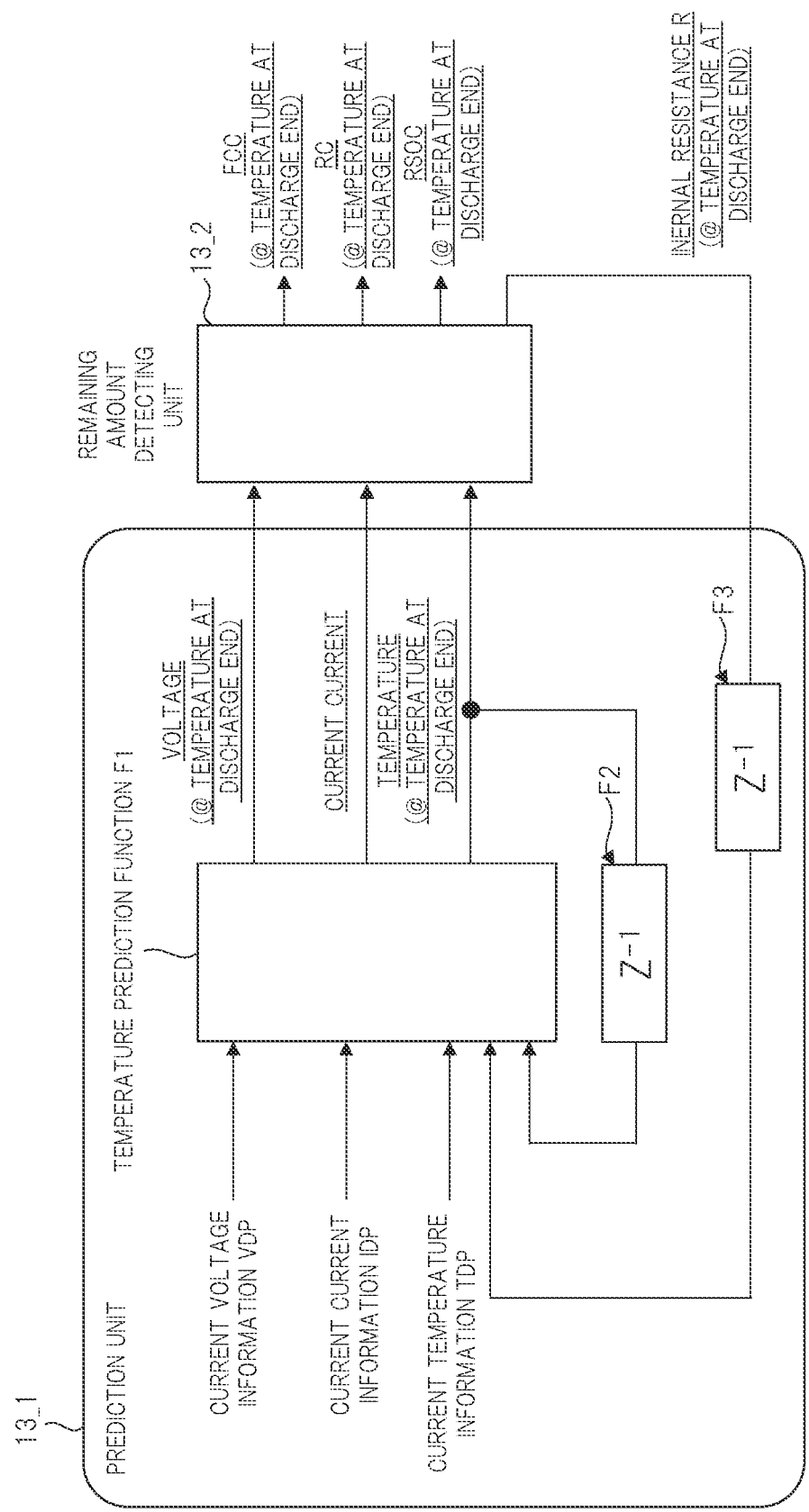
FIG. 2 is a diagram for explaining a process performed by a data processing circuit according to the embodiment.

FIG. 2 is a diagram for explaining a process performed by the data processing circuit according to the embodiment. The data processing circuit 13 includes a prediction unit 13_1 and a remaining amount detecting unit 13_2.

The prediction unit 13_1 includes a temperature prediction function F1 and $Z^{-1}$ conversion functions F2 and F3. To the temperature prediction function F1, from the voltage measuring circuit 10, the current measuring circuit 11 and the battery temperature detection circuit 5 shown in FIG. 1, the current voltage information VDP, the current current information IDP and the current temperature information TDP are supplied. Further, the temperature prediction function F1 is supplied with information from $Z^{-1}$ conversion functions F2 and F3. The temperature prediction function F1 generates the current temperature considering the voltage of the current battery 3 considering the temperature at the discharge termination of the battery 3 (FIG. 1), the current and the temperature at the discharge termination of the battery 3 based on these supplied information. In the figure described hereinafter, "(Temperature at @ discharge end)" is added to the one considering the temperature at the discharge end of the battery 3.

The $Z^{-1}$ conversion functions F2 and F3 output the supplied one at a delay of one sampling period. Since the temperature output from the temperature predicting function F1 (temperature at @ discharge termination) is supplied to the $Z^{-1}$ converting function F2, prior to one sampling period, the temperature output from the temperature predicting function F1 (temperature at @ discharge termination) will be supplied to the temperature predicting function F1 again. To the $Z^{-1}$ converting function F3, the internal resistor R output from the remaining amount detecting unit 13_2 (temperature at @ discharging end) is supplied. An internal resistance R, which will be described later, shows the internal resistance of the battery 3. Therefore, before one sampling period, the internal resistance of the battery 3 output from the remaining amount detecting unit 13_2 (temperature at @ discharge termination) will be supplied to the temperature prediction function F1. Incidentally, the internal resistance (temperature at @ discharge termination) will be simply referred to as internal resistance information hereinafter.

As the remaining amount detecting unit 13_2, although not particularly limited, in the embodiment, the configuration described in Patent Document 1 is used. Specifically, the voltage generated by the prediction unit 13_1 (temperature at @ discharge termination) and the current current and temperature (temperature at @ discharge termination) are supplied to the data processing control unit shown in FIG. 1 in Patent Document 1 (125) as the voltage information (DV), as current information (DI) and temperature information (DT) shown in FIG. 1 in Patent Document 1. As described in Patent Document 1, the data processing control unit (125), based on these information supplied, outputs a state information indicating the state of the battery 3. In FIG. 2, as the state information indicating the state of the battery 3, the full charge capacity FCC (temperature at @ discharge termination), the remaining amount RC (temperature at @ discharge termination), the remaining amount ratio RSOC (temperature at @ discharge termination) are shown. Here, the remaining amount RC is information indicating the remaining amount of the battery 3. Further, the remaining amount ratio RSOC is information indicating the state of charge of the battery 3, and the remaining capacity ratio represented by RSOC=RC/FCC (relative charge ratio).

Figure 3:
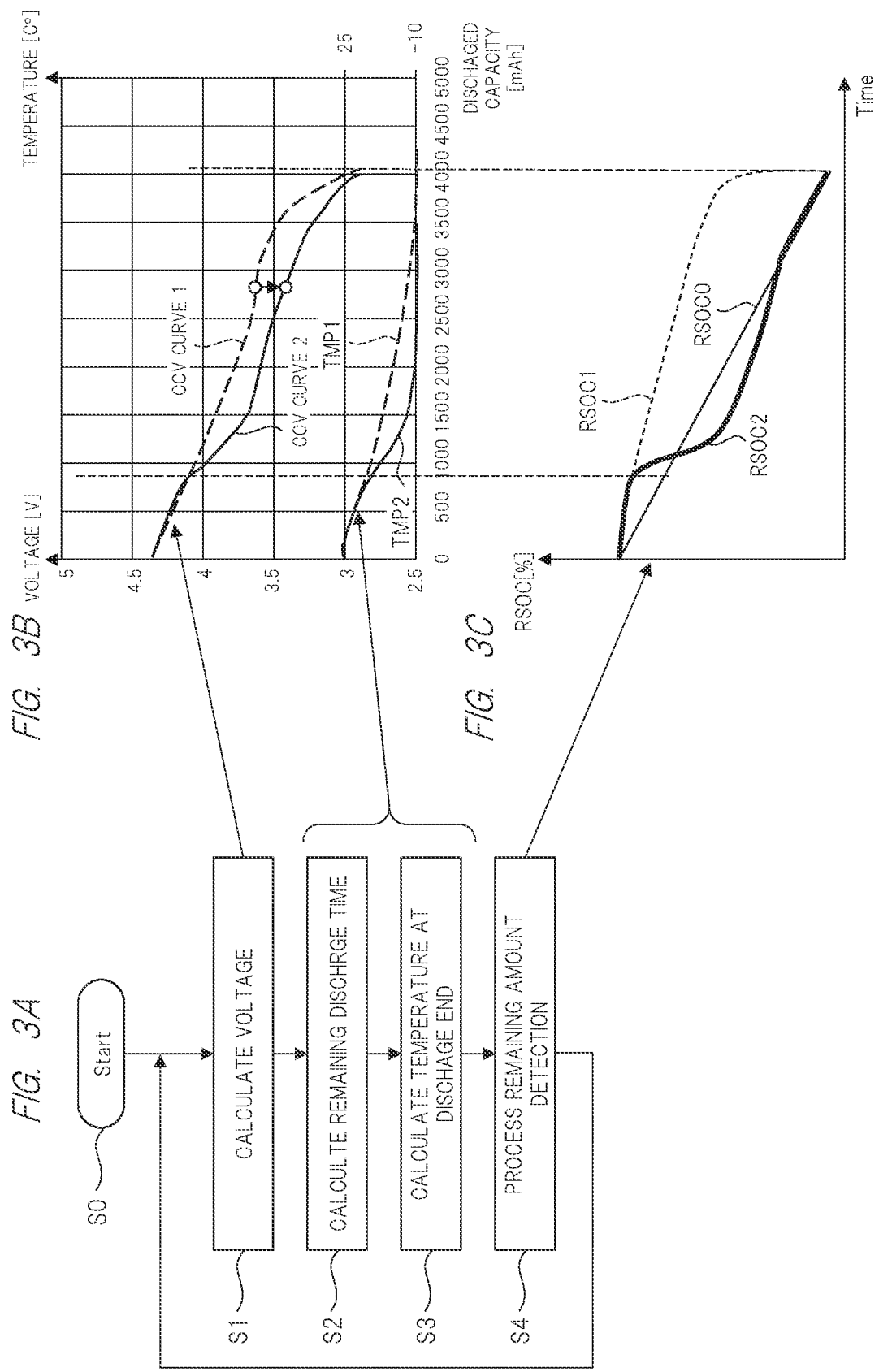
FIG. 3A is a diagram showing an operation of a prediction unit according to the embodiment.
FIG. 3B is a diagram showing an operation of the prediction unit according to the embodiment.
FIG. 3C is a diagram showing an operation of the prediction unit according to the embodiment.

The internal resistance R outputted from the remaining amount detecting unit 13_2 (temperature at @ discharge termination) corresponds to the output from the R-estimating unit (313) shown in FIG. 2 in Patent Document 1. An equivalent circuit of the battery 3 can be represented as shown in FIG. 3 of Patent Document 1. That is, the battery 3 can be regarded as being constituted by a series circuit of parallel connection pairs of the open-circuit voltage OCV when the state of not being charged and discharged (open state in which no charging current and discharging current flows), the internal resistance R, the polarization resistance (rp), and the capacitor component Cp. The internal resistance R of the battery varies depending on the temperature of the battery 3. R-estimating unit (313) outputs the value of the internal resistance R corresponding to the temperature represented by the temperature information at that time. Therefore, from the remaining amount detecting unit 13_2, the value of the internal resistor R corresponding to the temperature considering the temperature at the time of discharge termination is output via the $Z^{-1}$ converting function F3, and it will be supplied to the temperature predicting function F1.

<Predictive Unit>

Next, the operation of the prediction unit 13_1 will be described with reference to the drawings. FIG. 3 is a diagram showing the operation of the prediction unit according to the embodiment. Here, FIG. 3A is a flowchart diagram illustrating the overall operation of the prediction unit 13_1, and FIGS. 3B and 3C are diagrams illustrating the effect of the prediction unit 13_1. For FIGS. 3B and 3C, as they will be described later, descriptions are omitted here.

In step S0, the prediction unit 13_1 and the remaining amount detecting unit 13_2 (FIG. 2) start an operation. Subsequently, steps S1 to S4 are executed repeatedly. In the embodiment, one operation of steps S1 to S4 will be described as being performed in one sampling period.

In step S1, based on the voltage of the battery 3 represented by the current voltage information VDP and the internal resistor R (the temperature at the end of discharge) of one sampling period prior to $Z^{-1}$ converting function F3, the voltage of the current battery 3 considering the temperature at the end of discharge is calculated. The voltage of the battery 3 calculated here is supplied to the remaining amount detecting unit 13_2 as a voltage (temperature at the time of @ discharge termination).

Next, in step S2, according to a change in the voltage of the battery 3, a calculation of the remaining amount discharge time (remaining discharge time) of the battery 3 is performed. In step S3, on the basis of the remaining amount discharge time calculated in step S2, the present temperature information TDP, and the temperature before one sampling period from $Z^{-1}$ converting function F2 (the temperature at the time of @ discharge termination), the temperature at the time of discharge termination of the battery 3 is calculated.

The prediction unit 13_1, based on the temperature at the discharge termination calculated in step S3, converts the temperature represented by the current temperature information TDP, generates a temperature in consideration of the temperature at the discharge termination, as temperature (@ temperature at the discharge termination), and supplies the temperature to the remaining amount detecting unit 13_2.

Thereafter, in step S4, the remaining amount detecting unit 13_2 shown in FIG. 2 performs a process of detecting the state of the battery 3 (the remaining amount) according to the current current, the voltage (temperature at @ discharge end) and the temperature (temperature at @ discharge end). After step S4, the process returns to step S1, and steps S1 to S4 are repeated.

Next, the above-described steps S1 to S3 will be described in more detail with reference to the drawings. In order to facilitate the following description, the terms used in the following description will now be explained.

Qmax indicates the total capacity of the battery 3 in the fully charged state, a capacity value that can be taken out from the battery 3, when discharging the battery 3 from the fully charged state to the discharge cutoff voltage at a discharge rate to the extent that the voltage drop due to the internal resistor R is negligible. Quse is an integral value $\int Idt$ of the discharging current I of the battery 3. SOC is information indicating the state of charge of the battery 3, and the remaining capacity ratio SOC=(Qmax−Quse)/Qmax*100 in the total capacity Qmax. CCV indicates the closed circuit voltage of the battery 3 that is the voltage of the battery when a current is flowing through the internal resistor R or the like. Further, FIG. 10 is a diagram showing a mathematical formula according to the embodiment.

<<Step S1>>

Figure 4:
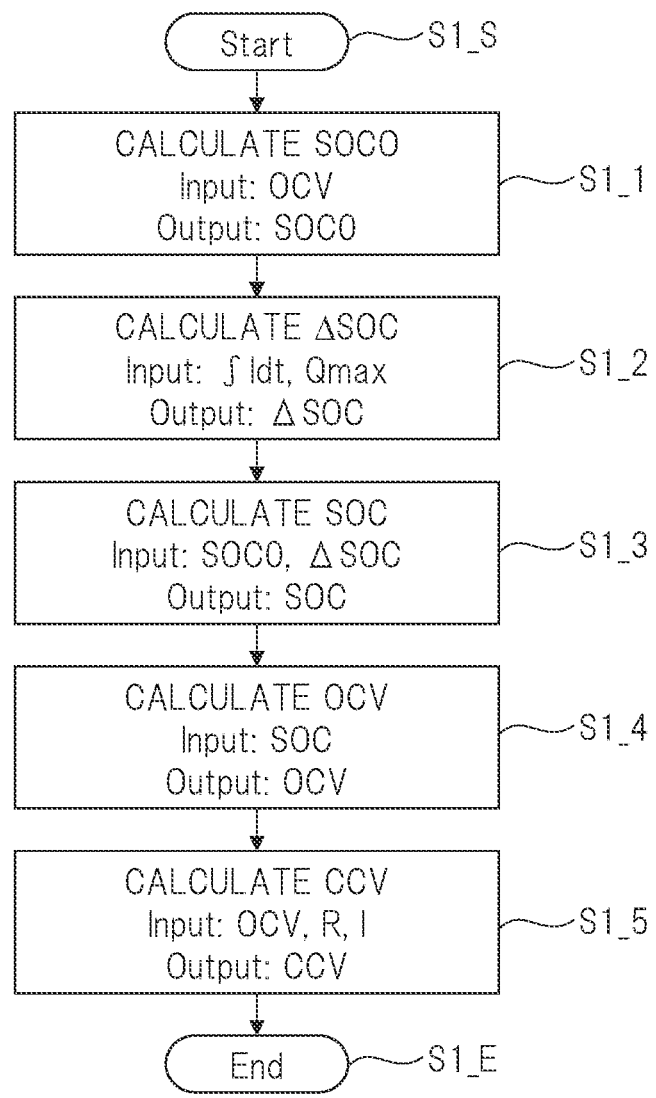
FIG. 4 is a flowchart showing details of a step of calculating a voltage according to the embodiment.
Figure 5:
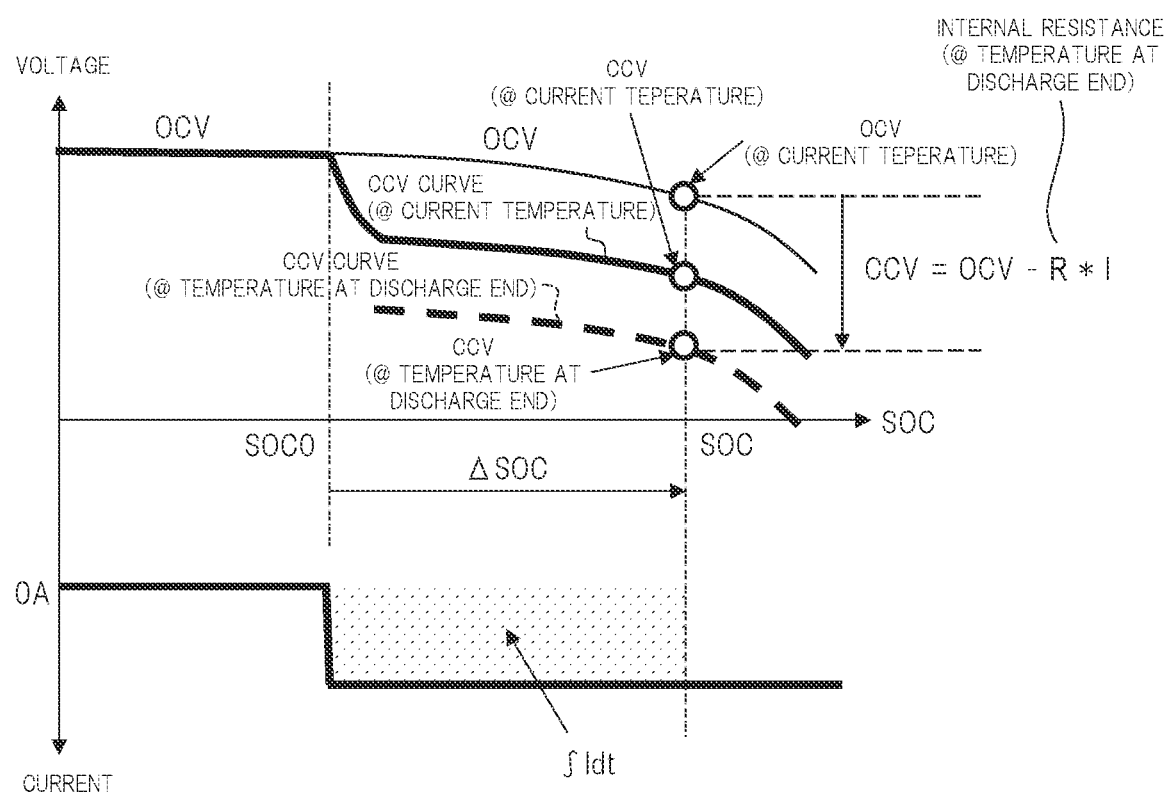
FIG. 5 is a diagram for explaining an operation of the step of calculating a voltage according to the embodiment.

FIG. 4 is a flowchart showing details of step S1 for calculating the voltage according to the embodiment. Further, FIG. 5 is a diagram for explaining the operation of step S1 for calculating the voltage according to the embodiment.

In step S1_S, step S1 starts. Next, in step S1_1, the state SOC of the battery 3 is calculated. Equation of calculation at this time (1) is shown in FIG. 10. The function SOC (OCV) shown in Equation (1) of FIG. 10, as described in Patent Document 1, is a function representing the state of charge SOC with respect to the open-circuit voltage OCV. In step S1_1, it is exemplified that the battery 3 calculates the initial status SOC0 prior to starting discharging. As shown in FIG. 5, in the early status SOC0, since no discharging is performed, the current of the battery 3 is OA. The input of Equation (1) is the open-circuit voltage OCV, and the output of Equation (1) is the state SOC.

In step S1_2, the change amount ΔSOC of the state SOC of the battery 3 due to discharge is calculated. The change ΔSOC is calculated based on the equation (2) shown in FIG. 10. The inputs in Equation (2) are the integral value $\int Idt$ and the total capacitance Qmax, and the output is the changed amount ΔSOC in the state SOC. Next, in step S1_3, the current state SOC is calculated. Calculation formula at this time, in FIG. 10 is shown as Equation (3). The input in Equation (3) is the initial state SOC0 and change ΔSOC, and the output is the current state SOC. Referring to FIG. 5, when the discharge current I of the battery 3 flows, the accumulation capacitance (dot display area) is reduced by an amount corresponding to the integral value $\int Idt$ of the discharge current, then the state is changed from SOC0 to SOC. The open-circuit voltage OCV of the battery 3 at this time drops from the initial open-circuit voltage and becomes OCV (@ the current temperature). Incidentally, (@ current temperature) added to the reference numeral indicates that the value represented by the reference numeral is a value at the current temperature of the battery 3 measured by the battery temperature sensing circuit 5 shown in FIG. 1.

In step S1_4, the value of the OCV (@ current temperature) is calculated. As the calculation formula at this time, an equation having a relationship opposite to the equation (1) shown in FIG. 10 is used. Also, the input of the equation at this time is the state SOC, and the output is the open-circuit voltage OCV (@ current temperature).

In step S1_5, the calculation of the closing voltage CCV (temperature at @ discharge termination) corresponding to the open-circuit voltage OCV determined in step S1_4 (@ current temperature) is performed. As the calculation formula at this time, equation (4) shown in FIG. 10 is used. The input of Equation (4) is OCV (@ current temperature), the internal resistance R (temperature at @ discharge termination) and the discharge current I, and the output is a closed circuit voltage CCV (temperature at @ discharge termination).

In step S1_5, as the internal resistance R of the battery 3, when using the value at the current temperature, the closing voltage determined in step S1_5, in FIG. 5, is the CCV (@ current temperature). Since the temperature at the discharge termination of the battery 3 is using an internal resistor that is not considered, the value of the closing voltage CCV is increased. Thus, as shown in FIG. 9, the discharge capacity that can be taken out is largely detected, and thus an error occurs. In contrast, as described above, as the internal resistance R of the battery 3, by using a value considering the temperature at the time of discharge termination, it is possible to reduce the error.

The internal resistance considering the temperature at the discharge termination of the battery 3, i.e., the internal resistance R (temperature at @ discharge termination) is supplied from the remaining amount detecting unit 13_2 in the embodiment. Generation of the internal resistor R (temperature at @ discharge termination) will be described later in step S3.

In step S1_E, the step S1 for calculating the voltage ends, and the process proceeds to the next step S2.

<<Step S2>>

Figure 6A:
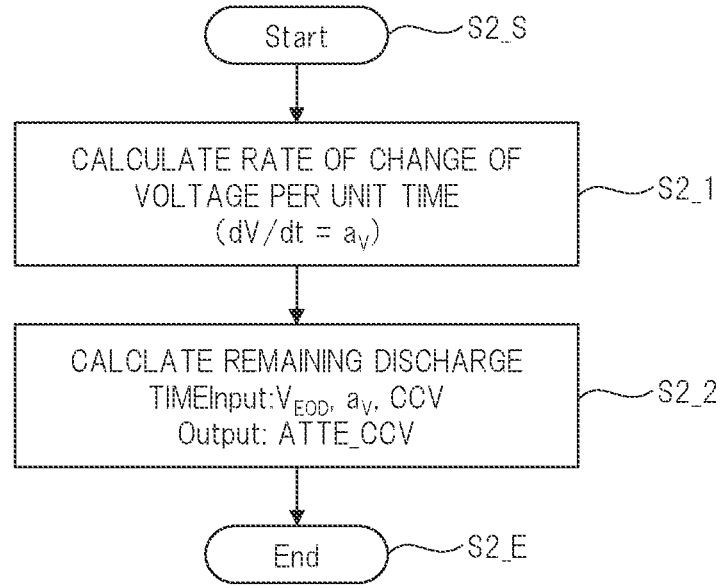
FIG. 6A is a diagram for explaining a step of calculating a remaining discharge time according to the embodiment.
Figure 6B:
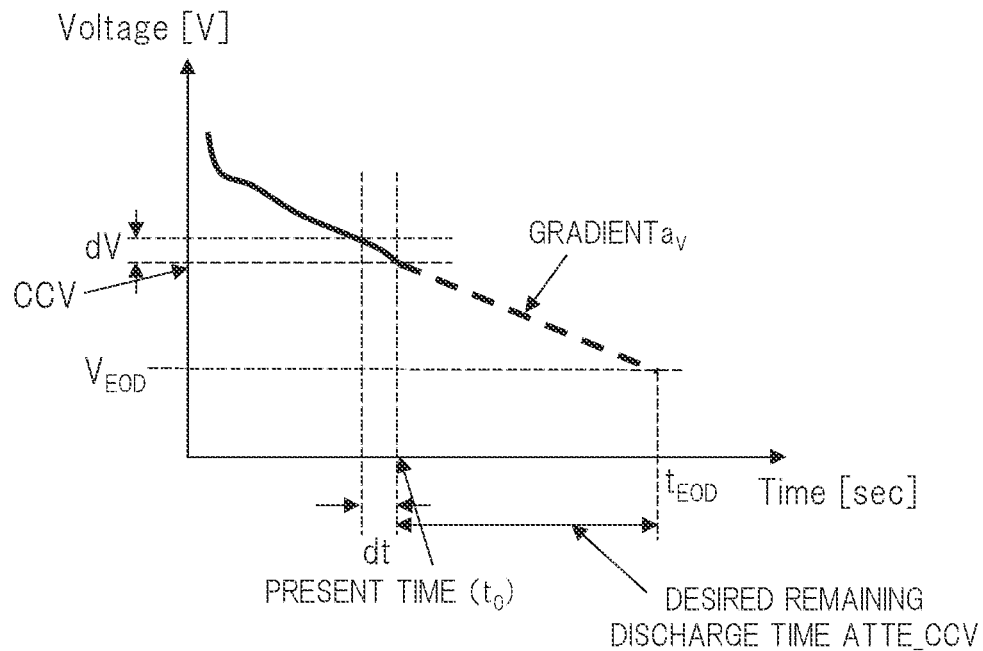
FIG. 6B is a diagram for explaining a step of calculating a remaining discharge time according to the embodiment.

Next, the step S2 for calculating the remaining discharge time will be described with reference to the drawings. FIGS. 6A and 6B are diagrams for explaining a step of calculating the remaining discharge time according to the embodiment. Here, FIG. 6A is a flowchart diagram showing the details of step S2, and FIG. 6B is a diagram for explaining the operation of step S2. In FIG. 6B, the horizontal axis represents time, the vertical axis represents the closed circuit voltage CCV of the battery 3.

In step S2_S, step S2 for calculating the remaining discharging time starts, then step S2_1 is executed.

In step S2_1, the voltage change rate of the voltage of the battery 3 is calculated. In the embodiment, the voltage change rate $a_v$, of the closed circuit voltage CCV of the battery 3 (=dV/dt) per unit time is calculated. Here, dt corresponds to a time period from the initial state SOC0 shown in FIG. 5 to be changed to the state SOC, dV corresponds to the potential difference between the closed circuit voltage CCV at the initial state SOC0 and the closed circuit voltage CCV (temperature at @ discharge termination) in the state SOC. Thus, by executing step S2_1, as shown in FIG. 6B, the slope of the closed-circuit voltage CCV is determined as a voltage change rate $a_v$.

In step S2_2, using the voltage change rate $a_v$ obtained in step S2_1, calculation of the remaining discharge time ATTE_CCV until the closed circuit voltage CCV reaches the discharge cutoff voltage $V_{EOD}$ of $t_{EOD}$ at the time of discharge termination from the current time t0 is performed. Calculation formula used in step S2_1 is shown as equation (5) in FIG. 10. Input of Equation (5) is the discharge cutoff voltage $t_{EOD}$, the voltage change rate $a_v$ and the closed circuit voltage CCV (temperature at @ discharge termination), and the output is the remaining discharge time ATTE_CCV. After step S2_2, by executing step S2_E, the process in step S2 ends.

By executing step S2, from the value of the closed circuit voltage CCV which has changed from the time of the initial state SOC0 to the present time t0, it is possible to predict the time of the remaining capacity that can be taken out by the discharge termination.

<<Step S3>>

Figure 7A:
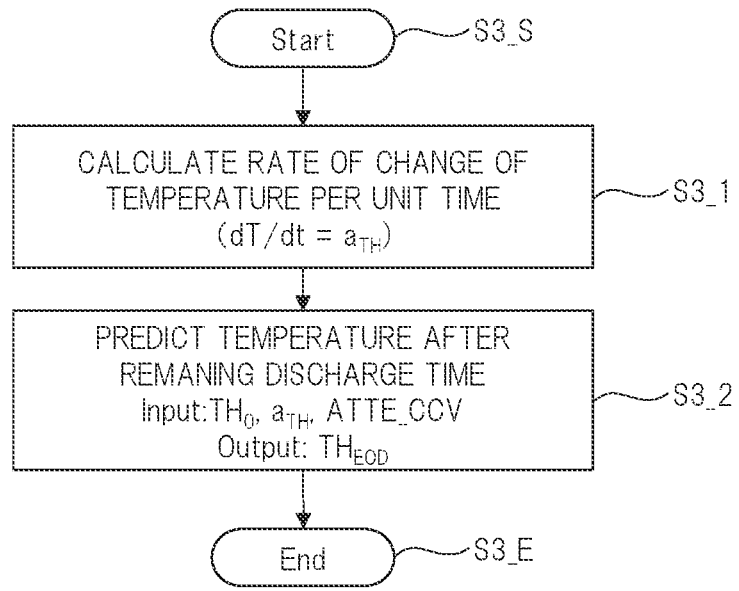
FIG. 7A is a diagram for explaining a step of calculating a temperature at a discharge termination according to the embodiment.
Figure 7B:
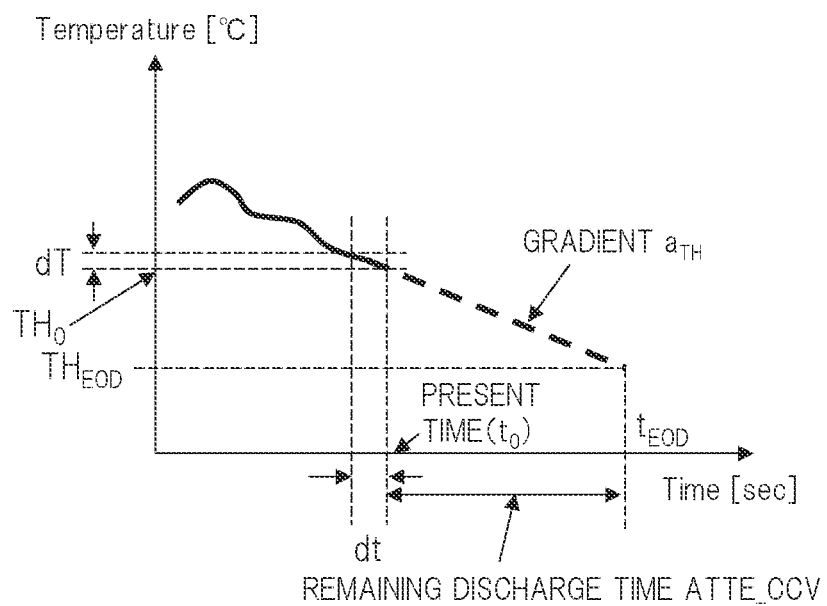
FIG. 7B is a diagram for explaining a step of calculating a temperature at a discharge termination according to the embodiment.

Step S3 for calculating the temperature at the time of discharge termination will be described with reference to the drawings. FIG. 7 is a diagram for explaining a step of calculating the temperature at the time of discharge termination according to the embodiment. Here, FIG. 7A is a flowchart diagram showing details of step S3, and FIG. 7B is a diagram for explaining an operation of step S3. In FIG. 7B, the horizontal axis represents time, and the vertical axis represents the temperature of the battery 3.

In step S3_S, step S3 starts. In the next step S3_1, the rate of change $a_{TH}$ (=dT/dt) of the temperature per unit time is calculated based on a change of the temperature of the battery 3. Here, dT is the temperature difference between the temperature of the battery 3 notified from the battery temperature detection circuit 5 (FIG. 1) and the temperature $TH_0$ notified from the present (time t0) and the battery temperature detection circuit 5 in the initial state SOC0. Further, dt is the time described in step S2. Thus, the temperature change rate a-r of the battery from the initial state SOC0 to the present is calculated.

Following step S3_1, step S3_2 is executed. In step S3_2, prediction of the temperature of the battery 3 reaching in the remaining discharge time ATTE_CCV predicted in step S2 is performed. In step S3_2, the Equation (6) shown in FIG. 10 is executed. The input of the equation (6) is the present temperature $TH_0$, the temperature change rate $a_{TH}$, and the remaining discharging time ATTE_CCV predicted in step S2. By executing Equation (6), as shown in FIG. 7B, it is possible to determine the temperature $TH_{EOD}$ of the battery 3 at $t_{EOD}$ the discharge termination, it is possible to predict the temperature at which the battery 3 reaches at the discharge termination.

After step S3_2, step S3_E for terminating step S3 is executed.

The temperature predicting function F1 converts the temperature of the battery 3 represented by the present temperature information TDP using the temperature $TH_{EOD}$ at the discharge termination predicted in step S3, and outputs the temperature obtained by the conversion as the temperature of the present battery (@ the temperature at the discharge termination). The temperature conversion, for example, obtains a temperature ratio between the temperature at the time of discharge termination set in the initial and the temperature at the time of discharge termination predicted in step S3, and is performed by obtaining the product of the temperature ratio and the temperature of the current battery 3 represented by temperature information TDP. The temperature prediction function F1 supplies the temperature obtained by the product calculation to the remaining amount detection unit 13_2 shown in FIG. 2 as the current battery temperature (@temperature at the end of discharge).

The remaining amount detecting unit 13_2 generates an internal resistance based on the supplied temperature (temperature at @ discharge termination), i.e., internal resistance R (temperature at @ discharge termination), and supplies it to the prediction unit 13_1 in the next sampling period.

The remaining amount detecting unit 13_2, as follows, generates an internal resistance in consideration of the temperature at the time of discharge termination. That is, the remaining amount detecting unit 13_2, as described in Patent Document 1, based on the supplied temperature (temperature at @ discharge termination), with reference to the function or table, obtains internal resistance R corresponding to the current temperature (temperature at @ discharge termination). The remaining amount detecting unit 13_2 outputs the obtained internal resistance R in the next sampling period as internal resistance R (temperature at @ discharge termination).

When step S3 is completed, as shown in FIG. 3, step S4 for executing the remaining amount detection process is executed.

Thereafter, as shown in FIG. 3, steps S1 to S4 are repeated. In the repeated steps S1 to S3, the processing is performed based on the current value and the value before one sampling period.

For example, in step S1_5, using the internal resistor R before one sampling period (temperature at @ discharge termination), the calculation of the closed circuit voltage CCV is performed. In this case, in step S1_5, before one sampling period, the internal resistance R of the battery 3 according to the temperature generated by the temperature conversion based on the temperature at the time of the discharge termination calculated in step S3 and the temperature of the battery 3 at that time (@ the temperature at the discharge termination) will be supplied from the remaining amount detecting unit 13_2. Then, in step S1_5, the calculation of the equation (4) is performed according to the internal resistance R before the one sampling period (temperature at @ discharge termination), the voltage of the battery at the current time, and the current of the battery at the current time, and the voltage of the battery 3 considering the temperature at the time of discharge termination will be obtained.

Further, in step S3_1, the rate of change in temperature is calculated using the temperature before one sampling period (temperature at @ discharge end) and the current temperature of converted temperature. Thus, in step S1, the closed circuit voltage CCV of the battery 3 which is changed with the lapse of time (temperature at @ discharge termination) is calculated, in step S2, the remaining amount discharge time ATT_CCV which is changed with the lapse of time is calculated, in step S3, the temperature $TH_{EOD}$ at the discharge termination which is changed with the lapse of time will be predicted. Further, in step S4, the remaining amount of the battery 3 that is changed with the lapse of time is detected.

In FIG. 3B, a curve of CCV curve 2 of the closed circuit voltage CCV of the battery 3 calculated by the step S1 is repeated, and a curve of CCV curve 1 of the closed circuit voltage CCV of the battery 3 determined without executing the step S1 (broken line) are shown. Further, in FIG. 3B, the temperature transition predicted by steps S2 and S3 are repeated is shown as TMP2, the temperature transition when not executing steps S2 and S3 is shown as TMP1 (broken line). In FIG. 3B, the horizontal axis represents the discharge capacity, the vertical axis on the left shows the voltage corresponding to the curves of CCV curve 1 and CCV curve 2, the vertical axis on the right shows the temperature corresponding to the temperature transitions TMP1 and TMP2.

As steps S2 and S3 are performed, the temperature at the discharge end is predicted, and the temperature obtained by considering the temperature at the discharge end is changed as in the temperature transition TMP2. Thus, as shown in FIG. 3B, the temperature transition TMP2 is lower than the temperature transition TMP1. Further, the curve CCV curve 1, since the temperature at the time of discharge termination is not considered, shows the same changes as the voltage characteristics shown in FIG. 8A. In contrast, in step S1 in the embodiment, the internal resistance R upon calculating the closed-circuit voltage CCV is a value obtained by considering the temperature at the time of discharge termination. Therefore, the closed-circuit voltage CCV represented by the curve of CCV curve 2, as compared with the closed-circuit voltage represented by the curve CCV curve 1, decreases with less discharge capacity.

In FIG. 3C, the remaining amount of the battery 3 with the lapse of time is indicated by the remaining amount ratio RSOC. FIG. 3C is similar to FIG. 9, RSOC1 shown in FIG. 3C corresponds to the curved RSOC1 shown in FIG. 9, and RSOC0 corresponds to the linear RSOC0 of the true value shown in FIG. 9. Further, transition of the remaining amount determined by the step S4 shown in FIG. 3A is repeatedly executed (here, the remaining amount ratio RSOC) is shown as RSOC2 in FIG. 3C. As can be understood from FIG. 3C, immediately after the discharge of the battery 3 is started, while the curve of RSOC2 is separated from the straight line of the true value RSOC0, when the time has elapsed and gets closer to the discharge termination, the curve of RSOC2 becomes closer to the straight line of the true value RSOC0, so that it is possible to reduce the error.

APPENDIX

In addition to the invention described in the claims, the present invention is described herein. Representative inventions are listed below.

(A) A battery pack including:
a battery;
a battery temperature detecting circuit for detecting a temperature of the battery mounted on the battery; and,
a semiconductor device coupled to the battery and the battery temperature detection circuit,
wherein the semiconductor device includes:
a prediction unit for predicting the temperature at the time of discharge termination of the battery, and, outputting a voltage of the battery in consideration of the temperature at the discharge termination predicted from the temperature notified from the battery temperature detection circuit; and
a remaining amount detecting unit for detecting the remaining amount of the battery based on a voltage of the battery output by the prediction unit and a current of the battery.

(B) In the battery pack according to (A),
the prediction unit obtains a voltage change rate of the voltage of the battery at a predetermined time, predicts the discharge time until the voltage of the battery reaches the discharge termination voltage at the discharge termination based on the voltage change rate, and predicts the temperature at the discharge termination based on the change rate of the temperature at the predetermined time and the discharge time.

(C) In the battery pack according to (B),
the remaining amount detecting unit notifies the prediction unit of the internal resistance information of the battery corresponding to a temperature determined based on the temperature at the discharge termination and the temperature of the battery, and
the prediction unit outputs a voltage of the battery in consideration of the temperature at the discharge termination based on the voltage of the battery and the notified internal resistance information and the current of the battery.

(D) In the battery pack according to (C),
the battery pack further includes a communication circuit for notifying the other semiconductor device of the remaining amount information relating to the remaining amount of the detected battery.

Although the invention made by the inventors of the present inventions has been specifically described based on the embodiment, the present invention is not limited to the above embodiment, and it is needless to say that various modifications can be made within the scope of the invention. For example, the internal resistance R (temperature at @ discharge termination) may be generated as follows. That is, it may be realized such that a plurality of functions or tables corresponding to the temperature at different discharging terminations from each other are provided to the remaining amount detecting unit 13_2, and a function or table corresponding to the supplied temperature $TH_{EOD}$ is selected. In this case, the remaining amount detecting unit 13_2, based on the current temperature supplied from the prediction unit 13_1, obtains the internal resistance R from a function or table selected in advance, and supplies the internal resistance R obtained as the internal resistance R (temperature at @ discharge termination) to the prediction unit 13_1.

The invention claimed is:
1. A semiconductor device for controlling a state of a battery, the semiconductor device comprising:
a prediction unit configured to predict a first temperature at a time of discharge termination of the battery from a current temperature of the battery at a current time, and outputs a first voltage of the battery in consideration of the first temperature;

a remaining amount detecting unit configured to detect a remaining amount of the battery based on the first voltage of the battery output by the prediction unit and a current of the battery at the current time; and a charge-discharge control circuit configured to charge and discharge the battery, wherein the prediction unit obtains a current voltage of the battery at the current time, a voltage change rate of the current voltage of the battery over a predetermined period of time, calculates a discharge time from the current time until the current voltage of the battery is expected to reach a discharge termination voltage at the discharge termination based on the voltage change rate, and predicts the first temperature of the battery based on a rate of change of a third temperature of the battery over the predetermined period of time and the discharge time.

2. The semiconductor device according to claim 1, wherein the remaining amount detecting unit notifies the prediction unit of internal resistance information of the battery based on a temperature obtained by temperature conversion using the first temperature and the current temperature, and wherein the prediction unit outputs the first voltage of the battery in consideration of the first temperature based on the current voltage of the battery, the notified internal resistance information, and the current of the battery.

3. The semiconductor device according to claim 2, wherein the prediction unit is notified of the current temperature of the battery from a battery temperature detection circuit mounted on the battery, the current of the battery is notified from a current detection circuit coupled to the battery, and the current voltage of the battery is notified from a voltage measurement circuit coupled to the battery.

4. A semiconductor device for controlling a state of a battery, the semiconductor device comprising:

a prediction unit configured to predict a first temperature of the battery at a discharge termination and determine a second temperature of the battery in consideration of the predicted first temperature;

a remaining amount detecting unit configured to notify the prediction unit of internal resistance information of the battery corresponding to the second temperature of the battery in consideration of the temperature at the discharge termination determined by the prediction unit; and a charge-discharge control circuit configured to charge and discharge the battery, wherein the prediction unit obtains a current voltage of the battery at a current time, obtains a first voltage of the battery in consideration of the first temperature of the battery based on the current voltage of the battery, the internal resistance information of the battery, and a current of the battery, and outputs the first voltage of the battery to the remaining amount detecting unit, and wherein the prediction unit obtains a voltage change rate of the current voltage of the battery over a predetermined period of time, obtains a discharge time from the current time until the current voltage of the battery is expected to reach a discharge termination voltage at the time of the discharge termination based on the voltage change rate, and predicts the first temperature of the battery based on a rate of change of a third temperature of the battery over the predetermined period of time and the discharge time.

5. The semiconductor device according to claim 4, wherein the prediction unit is notified of the second temperature of the battery from a battery temperature detection circuit mounted on the battery, the current of the battery is notified from a current detection circuit coupled to the battery, and the current voltage of the battery is notified from a voltage measurement circuit coupled to the battery.

6. The semiconductor device according to claim 5, wherein the prediction unit calculates a product of the current and the internal resistance information of the battery, and outputs the current voltage of the battery in consideration of the first temperature based on the calculated product and the current voltage of the battery.

7. A method of controlling a battery level, the method comprising:
(a) calculating a discharge time from a current time until a current voltage of a battery is expected to reach a discharge termination voltage at a discharge termination of the battery according to a voltage change rate of the battery;
(b) calculating a temperature at the discharge termination of the battery based on a rate of change of a temperature of the battery and the discharge time calculated in (a);
(c) calculating a first voltage of the battery in consideration of the temperature at the discharge termination based on internal resistance information of the battery according to a temperature generated by converting a current temperature of the battery using the temperature at the discharge termination calculated in (b), the first voltage of the battery, and a current of the battery; and
(d) controlling, using a charge-discharge control circuit, charging and discharging of the battery.

8. The method according to claim 7, wherein (c) includes calculating a product of the internal resistance information of the battery and the current of the battery, and subtracting the calculated product from the first voltage of the battery.

* * * * *